(12) United States Patent
Howcroft et al.

(10) Patent No.: US 10,044,743 B2
(45) Date of Patent: *Aug. 7, 2018

(54) SECURITY SCANNING SYSTEM AND METHOD

(71) Applicant: AT&T Intellectual Property I, L.P., Atlanta, GA (US)

(72) Inventors: Jerald Robert Howcroft, Beverly Hills, MI (US); John J. Markley, Wildwood, MO (US); Rocco A. Del Carmine, Waterbury, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,665

(22) Filed: Nov. 10, 2015

(65) Prior Publication Data

US 2016/0080409 A1     Mar. 17, 2016

Related U.S. Application Data

(63) Continuation of application No. 14/066,380, filed on Oct. 29, 2013, now Pat. No. 9,197,659, which is a
(Continued)

(51) Int. Cl.
   *G06F 21/56*        (2013.01)
   *G06F 21/57*        (2013.01)
(Continued)

(52) U.S. Cl.
CPC .......... *H04L 63/1433* (2013.01); *G06F 21/56* (2013.01); *G06F 21/57* (2013.01);
(Continued)

(58) Field of Classification Search
None
See application file for complete search history.

(56) References Cited

U.S. PATENT DOCUMENTS

| | | | |
|---|---|---|---|
| 4,654,852 A | 3/1987 | Bentley et al. | |
| 4,817,080 A | 3/1989 | Soha | |

(Continued)

OTHER PUBLICATIONS

International Search Report, International Patent Application No. PCT/US07/64495, dated Jul. 28, 2008, 3 pages.

(Continued)

*Primary Examiner* — Jason C Chiang
(74) *Attorney, Agent, or Firm* — Jackson Walker L.L.P.

(57) ABSTRACT

The present disclosure provides a computer-readable medium, method and system for determining security vulnerabilities for a plurality of application programs used to provide television services to a customer device over a communications network. The method includes running a first scanning program against a first application program relating to a control panel for the customer device; running a second scanning program against a second application program that provides Internet content to the customer device; running a third scanning program against a third application program that relates to a component management system of customer premises equipment; and correlating security vulnerabilities identified utilizing the first, second, and third scanning programs.

20 Claims, 6 Drawing Sheets

Related U.S. Application Data continuation of application No. 13/776,429, filed on Feb. 25, 2013, now Pat. No. 8,601,582, which is a continuation of application No. 11/385,609, filed on Mar. 21, 2006, now Pat. No. 8,387,138.

(51) Int. Cl.

| | | |
|---|---|---|
| *H04L 29/06* | (2006.01) | |
| *H04N 7/173* | (2011.01) | |
| *H04N 21/24* | (2011.01) | |
| *H04N 21/443* | (2011.01) | |
| *H04N 21/81* | (2011.01) | |
| *H04N 21/854* | (2011.01) | |
| *H04N 21/442* | (2011.01) | |

(52) U.S. Cl.
CPC ............ *G06F 21/577* (2013.01); *H04L 63/14* (2013.01); *H04N 7/173* (2013.01); *H04N 21/24* (2013.01); *H04N 21/442* (2013.01); *H04N 21/443* (2013.01); *H04N 21/8166* (2013.01); *H04N 21/854* (2013.01)

(56) References Cited

U.S. PATENT DOCUMENTS

| | | |
|---|---|---|
| 5,072,370 A | 12/1991 | Durdik |
| 5,123,017 A | 6/1992 | Simpkins et al. |
| 5,159,685 A | 10/1992 | Kung |
| 5,319,776 A | 7/1994 | Hile et al. |
| 5,377,196 A | 12/1994 | Godlew et al. |
| 5,394,543 A | 8/1995 | Hill et al. |
| 5,475,625 A | 12/1995 | Glaschick |
| 5,491,791 A | 2/1996 | Glowny et al. |
| 5,544,308 A | 8/1996 | Giordano et al. |
| 5,958,008 A | 9/1999 | Pogrebisky et al. |
| 5,960,170 A | 9/1999 | Chen et al. |
| 6,404,503 B1 | 6/2002 | Sardo |
| 6,530,022 B1* | 3/2003 | Blair ................... H04L 63/0823 713/175 |
| 6,535,227 B1* | 3/2003 | Fox .......................... H04L 41/20 709/223 |
| 6,976,163 B1* | 12/2005 | Hind ..................... G06F 21/572 713/1 |
| 7,243,148 B2* | 7/2007 | Keir ..................... G02B 5/3083 709/224 |
| 7,257,630 B2* | 8/2007 | Cole ..................... G02B 5/3083 709/224 |
| 2002/0035404 A1 | 3/2002 | Ficco et al. |
| 2004/0163126 A1* | 8/2004 | Phillips ................ G06F 19/3418 725/120 |
| 2004/0197082 A1 | 10/2004 | Yim |
| 2004/0261116 A1* | 12/2004 | Mckeown ................ H04L 12/24 725/109 |
| 2006/0085852 A1* | 4/2006 | Sima ..................... G06F 21/552 726/22 |
| 2006/0136720 A1* | 6/2006 | Armstrong .............. G06F 21/53 713/164 |
| 2007/0198718 A1* | 8/2007 | Savoor ................ H04L 67/1097 709/226 |

OTHER PUBLICATIONS

Written Opinion of the International Searching Authority, International Patent Application No. PCT/US07/64495, dated Jul. 28, 2008, 4 pages.

* cited by examiner

FIG. 4

Vulnerability Highlights 400

| Success | Severity | Name | Category | Impact | Amount |
|---|---|---|---|---|---|
| | 402 | 404 | 406 | 408 | 410 |
| Vulnerable | High | Microsoft OS DoS (malformed .IITR request) | Buffer overflows | Attacker may launch a denial of Service attack, or inject arbitrary code | 2 |
| Vulnerable | High | Inject JavaScript into parameter (Cross site scripting attack) | Cross script scripting | Customer session and cookies are compromised. The attacker may be able to pose as a legitimate user to view and alter user records, and perform transactions as that user | 18 |
| Vulnerable | High  412 | Overflow a parameter's value | Buffer overflows | Application dependant. Possibility of denial of service or execution of arbitrary code  414 | 7 |
| Vulnerable | Medium | Retrieval of sensitive information through the global XXX file | Third party misconfigurations | Attackers may retrieve sensitive session information | 2 |
| Vulnerable | Medium | Microsoft OS 4.0 unauthorized... | Third party misconfigurations... | An attacker may gain full access to... | 2 |

SECURITY SCANNING SYSTEM AND METHOD

The present patent application is a continuation of U.S. patent application Ser. No. 14/066,380, filed Oct. 29, 2013, which is a continuation of U.S. patent application Ser. No. 13/776,429, filed Feb. 25, 2013, which is a continuation of U.S. patent application Ser. No. 11/385,609, filed Mar. 21, 2006, the entirety of which are hereby incorporated by reference.

The present disclosure relates to the field of security risks associated with programs used in connection with customer premises equipment.

Communication networks, such as Digital Subscriber Line (DSL) networks, are used for providing a variety of services, including Internet Protocol Television (IPTV), Video-on-Demand (VoD), Voice over Internet Protocol (VoIP), access to the Internet, etc. At the customer end, a Residential Gateway (RG), such as DSL Modem, interfaces with the network and a set-top-box (STB) that provides content (video, voice and data) to a television set.

To provide the variety of content from different providers, several applications (programs) are employed at the network side and at the customer premises equipment (CPE), such as the residential gateway and STB. Thus, various applications interact with each other to properly provide the content to the CPE and interactivity with the network elements. These applications include operating systems and application programs for operating the CPE. These applications and subsequent updates are generally provided by different application providers. For example, different manufacturers or suppliers provide applications for the residential gateway and the STBs, while other providers may provide control panels for the STBs. The applications are typically installed on the CPE by the manufacturers of such devices. Upgrades and patches are often downloaded to the CPE over the network. Each such program brings the possibility of introducing security vulnerabilities. To reduce the security risks, each provider of the applications program typically tests such programs individually by running security scanners against the application programs prior to the installation or release of such programs. Such security scanning methods are useful, but do not provide comprehensive and integrated methods for determining and fixing the security vulnerabilities of the various application programs for the network environment. Thus, there is a need for an improved system and method for determining security vulnerabilities of applications relating to CPE.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals, wherein:

FIG. 4 shows an exemplary high-level report according to one aspect of the present disclosure that summarizes the results from a scan performed via the user interface of FIG. 3;

DETAILED DESCRIPTION OF THE DISCLOSURE

Figure 1:
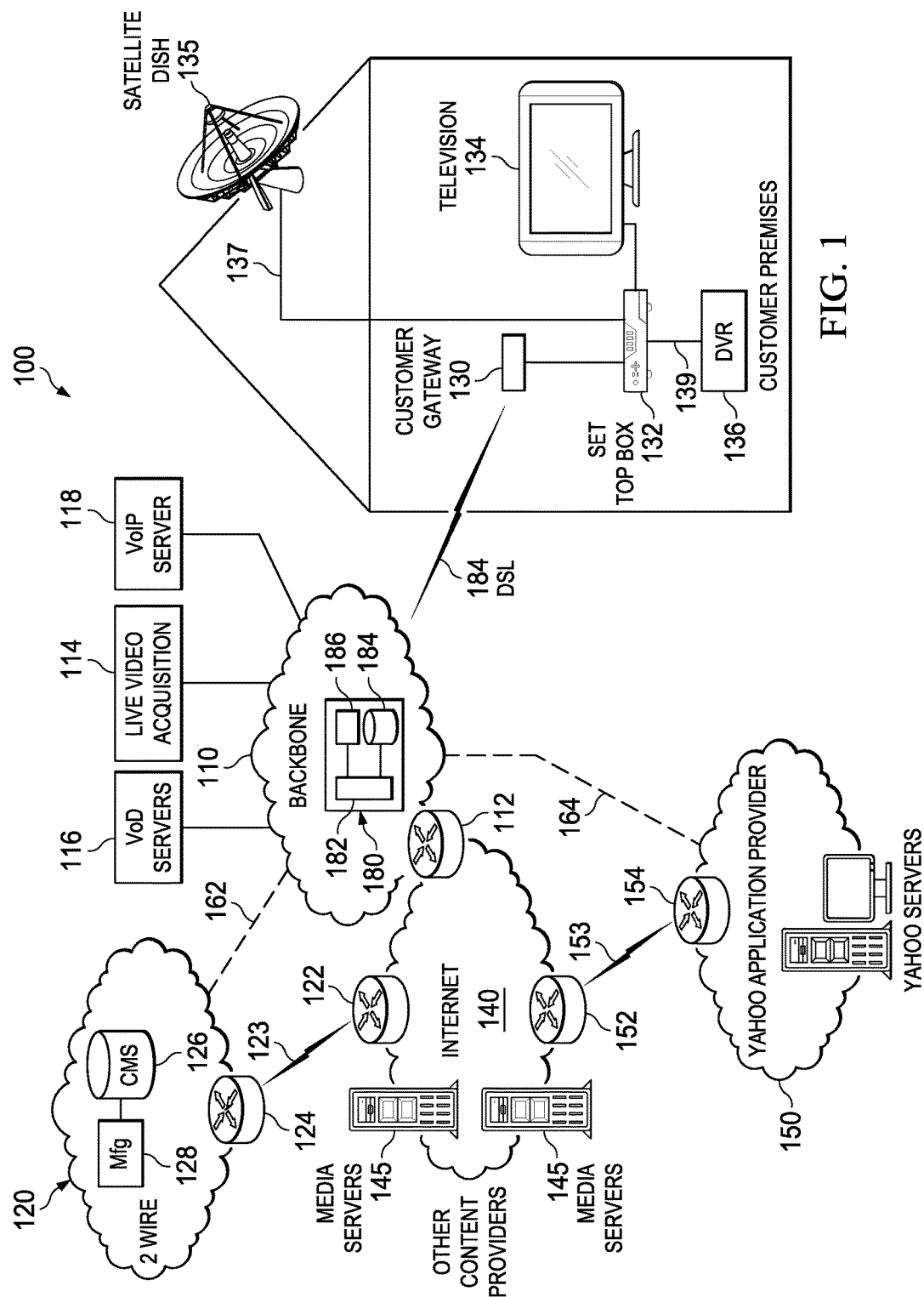
FIG. 1 shows an exemplary high-level functional diagram of a network for providing IPTV services according to one embodiment of the present disclosure.

In view of the above, the present disclosure through one or more of its various aspects and/or embodiments is presented to provide one or more advantages, such as those noted below.

The present disclosure provides a system, method and programs for determining security vulnerabilities of application programs that are used to provide television services to customer premises equipment (CPE), including residential gateways and set-top-boxes, over a communications network. In one aspect, the present disclosure provides a computer-readable medium accessible to a processor for executing instructions contained in a computer program embedded in the computer readable medium, the computer program including: instructions to run a first scanning program against a first application program relating to a control panel for a customer device; instructions to run a second scanning program against a second application program that provides Internet content to the customer device; instructions to run a third scanning program against a third application program that relates to providing management of CPE; and instructions to correlate security vulnerabilities identified utilizing the first, second, and third scanning programs. In one aspect, the disclosure includes instructions to run a fourth scanning program against a fourth application program for use in the customer device. The scanning programs used include a network scanner and a web-based scanner. The customer device may be a set-top-box for providing content to a television set. In one aspect, the third application program is a component management system. In another aspect, the first, second, and third scanning programs are run on a first server located in the communications network (such as in a back-bone network) against one of the first, second, and third application programs located at a second server.

In another aspect, the disclosure provides a method of determining security vulnerabilities for a plurality of application programs for use in providing television services to a customer device over a communications network, including: running a first scanning program against a first application program relating to a control panel for the customer device; running a second scanning program against a second application program that provides Internet content to the customer device; running a third scanning program against a component management system for CPE; and correlating security vulnerabilities identified utilizing the first, second, and third scanning programs. The customer device may be a set-top-box for providing content to a television set. In one aspect, a fourth scanning program is run against a fourth application program for use at the customer device. In another aspect, the first, second, and third scanning programs are run on a first server against one of the first, second, and third application programs located at a second server over the Internet. Access to the at least a second server may be obtained from the first server using a predefined identifier.

The disclosure, in another aspect, provides a telecommunications network system including: a customer device; one or more application servers running one or more application programs that provide television services to a customer device; and a network server running a program for correlating security vulnerabilities determined from a running scanning programs against a plurality of application programs. In one aspect, the set of scanning programs includes: a first scanning program to determine security vulnerabilities in a first application program relating to a control panel for the customer device; a second scanning program to determine security vulnerabilities in a second application program that provides Internet content to the customer device; and a third scanning program to determine security vulnerabilities in a third application program that is an element of a component management system associated with the CPE. The set of scanning programs may further include a fourth scanning program to determine security vulnerabilities in an application program in that is used at the customer device. In one aspect, the customer device is a set-top-box for providing content to a television set. In one aspect, the network server may run the set of scanning programs and additionally a program for obtaining access to the one or more application programs. The system provides a consolidated report of the various security vulnerabilities identified and assigns a risk factor to each security vulnerability based on a set of rules.

FIG. 1 shows a high-level functional diagram of a network 100 for providing television services according to one embodiment of the present disclosure. The network 100 is shown to include a backbone 110 that is coupled to the Internet 140 via one or more routers, such as a router 112. The backbone may provide at least one of IPTV services, cable service, or satellite services to users as well as other content available through these services and the Internet. Such content includes video content, audio content such as Voice over Internet Protocol (VoIP), and data content. The backbone includes a variety of servers, routers and transport links for providing the content to users. The backbone 110 is shown coupled to a live television content provider 114, that may include multiple television channels, such as those commonly delivered over television networks. The backbone 110 also is shown to include Video-on-Demand (VoD) servers 116 that provide Video-on-Demand and Voice over Internet Protocol (Voice over IP, or VoIP) server 118 that provides telephony service over a packet-switched network.

The backbone 110 is shown coupled via a Digital Subscriber Line (DSL) 184 to a customer gateway, such as a DSL modem 130, which is coupled to a customer device, such as a set-top-box (STB) 132 that is connected to television (TV) set 134. The customer gateway 130 may have a built-in firewall that interacts with the STB to enable remote management of the STB. Although only one STB is shown, more than one STB may be used at a customer premises. The backbone may alternatively couple to the STB via a cable connection to the STB or via a satellite connection to a satellite dish 135 located at the customer location and linked to the STB over a physical link 137. The STB may act as a control interface for the associated TV set. In addition, a recording device, such as Digital Video Recorder (DVR) 136, may be connected to STB 132 for the purpose of recording video content such as television content.

The backbone network 110 is further shown coupled to various application providers. For example, the backbone 110 is shown connected to an application provider 150 (such as "Yahoo") over the Internet 140 via link 153 and routers 152 and 154 that provides, among other things, web content to the STB as well as a "portal" or control panel to the STB for content navigation and selection. The control panel also enables an interactive display at TV 134 through which a viewer may access content. An example of a control panel is described in reference to FIG. 2. The backbone 110 also is shown connected to a Component Management System (CMS) of a partner provider 120 via the Internet 140 using link 123 and routers 122 and 124. The CMS 120 generally provides applications for managing various aspects of CPE, including the STB 132 and customer gateway 130, including functions to enable auto-configuration and remote management. Additionally, CMS also may maintain identifiers for the CPE, such as CPE addresses, enable customers to install updates, accounting functions relating to CPE, tracking certain operations of CPE, etc. The backbone 110, alternatively may be coupled to the application providers, such as providers 120 and 150, over direct links 162 and 164, respectively. The backbone 110 may also be coupled to or have access to other partner content providers (generally designated by numeral 145) such as an interactive gaming service that enables a customer to play games against other players via a television, and a gaming service that enables a customer to bet online and settle accounts. Additionally, certain applications are installed in the STB, which are typically developed and tested by the manufacturer of such devices and/or the service provider. The above-noted and other programs associated with the CPE typically include an operating system and various application programs.

As noted earlier, new versions of application programs as well as updates, patches and fixes are typically developed and tested for security vulnerabilities at the application providers. For new hardware, such programs are installed at the factory. Updates and other versions are often downloaded to the CPE over the network via the DSL, cable or satellite connection. DP addresses or other customer identifiers, such as CPE identifiers are used to control the downloading to specific CPE. Thus, in such methods, the various components of the CPE product launch are accessed individually for determining security risks or vulnerabilities and may not provide a systematic identification and resolution of the security risks of the various components of the CPE and other systems that are used to support the CPE.

Still referring to FIG. 1, the disclosure provides a system 180 for running security scanners against various applications programs associated with CPE to identify or determine security vulnerabilities, receive information about the security vulnerabilities from the other providers, correlate the security vulnerabilities, assign risks to the security vulnerabilities, and to take corrective actions before the launch of new programs and after the installation thereof. The system 180 includes one or more servers 182, a database 184 that stores security vulnerability information about each application program, various reports and other information relating to the testing of programs, and a set of computer programs 186 that includes security scanners, such as a network scanner available from Internet Security Services that scan operating systems for security vulnerabilities, and web-based scanners, such as known as APPSCAN, available from Watchfire, Inc. The computer programs 182 also include instructions that are executed by the server 182 to perform the methods and functions described herein.

In one aspect of the present disclosure, security scanning programs are used to determine security vulnerabilities of the applications developed at the various application providers. In one aspect, a scanning program determines security vulnerabilities at multiple levels of the application program, such as at the operating system (OS) level and at the website level. A website scanning program is used to test a web server level of an application. Typically, a web site URL (Uniform Resource Location) is provided to the scanning program by an operator. In one aspect, the scanning program may use a "webcrawler" program to automatically navigate the website and discover links and record responses as it navigates the site as a simulated user. The website scanning program creates a database of vulnerabilities based on the crawl. Some exemplary vulnerabilities that may occur at a web server level include vulnerability to identity theft by tampering with Internet cookies, electronic shoplifting through changing hidden fields, fraud through tampering with URL parameters, buffer overflow to shut down a business website, webpage hijacking, exploitation of programming backdoors used in testing and inadvertently left open, etc. These and other vulnerabilities may occur, for example, through a java application or a downloaded browser code. Upon correlating the database of vulnerabilities to a database of hacking programs, the website scanning program applies hacker techniques to test the suspected vulnerability of the web site. A detailed report may then be made concerning any located vulnerabilities at the scanned URL.

An OS scanning program is used to scan an operating system and any applications running at the OS level of a network device. The OS scanning program typically performs a scan on an OS operating at an entered IP address after an OS (such as Unix, Linux, etc.) including OS version numbers is provided by an operator. Exemplary OS security vulnerabilities may occur in a default account, a send mail application, an anonymous FTP, remote user accounts, etc. The OS scanning program returns a set of vulnerabilities of the scanned operating system, and the OS is then tested for those related security vulnerabilities. A report is then generated concerning any located vulnerabilities. An exemplary OS scanning program that may be used in one aspect of the present disclosure is the ISS security scanner of Internet Security Systems.

The present disclosure provides for scanning the programs associated with the CPE at both the OS level and the website level. The present disclosure provides for determining the security vulnerabilities in the network by testing applications at various network locations. Network locations may be specified by IP addresses, URLs or other suitable identifiers. In one aspect, the developed application may be scanned at the developer, such as the CMS application provider 120, and the Control Panel provider 150. In another aspect, the scanning program may scan the application at the CPE after it has been transmitted from the application provider to the CPE. Scanning programs are run against applications at these various locations and reports are generated. A typical scanning program includes at least one of an OS scanning program and a web site scanning program. The scanning programs may reside at any location in the network. In one aspect, the scanning programs reside with programs 186 in the backbone system 180. The scanning programs may be run on the server 180 at the backbone to scan applications at one or more application providers, such as application providers 120 and 150. A report of scanning results is created at the backbone system. In another aspect, a scanning program may be run on a processor located at an application provider and the reports created are sent to the server 180. For example, a production server 128 of the CMS provider 120 may execute a scanning program running tests on a CMS application version that is in a production stage, while programs running at server 180 oversee the testing to ensure that functional and technical requirements of the STB are met. The Control Panel application may also be tested in this manner. Other applications, such as that are used on the STB may be scanned by the server 180 by simulating the STB environment over the DSL line. For example, the scanning programs may be run against the STB via the DSL line using pass through on the residential gateway or by connecting the STB to an internal network that simulates the network conditions for the STB.

Thus, in one aspect, each application program is tested against both a network scanner and web-based scanner. Various scanning scenarios may be utilized for the purpose of this disclosure. As an example, in one scenario, a network scanner and a web-based scanner may be run against a production server to remotely scan the control panel using the system 180 or a server at the provider 150. Similarly, the network scanner and web-based scanner may be run against the CMS web servers at the provider 120 or remotely using the system 180. Additionally, the scanning programs may be run against the STB via the DSL line using pass-through on the residential gateway or by connecting the STB to an internal network so as to simulate the network conditions. Thus, in general, one or more scanning programs are run against the various components of the CPE using a centralized system, such as system 180, remotely or in conjunction with servers located at one or more application providers. Data generated by the security scanners is sent to the server 180 for storage. The system 180 correlates the security vulnerabilities identified by each of the scanning programs and provides suitable reports for taking corrective actions. An example of a report is described in reference to FIG. 4. The reports are forwarded to individuals or groups that address identified security vulnerabilities. The scanning programs may be run at any time or at a time selected by an operator of the scanning program. If there is a firewall functioning at an application provider, the scanning programs are run once access is granted. For example, a password may be exchanged at the application provider before running the scanning program.

Figure 2:
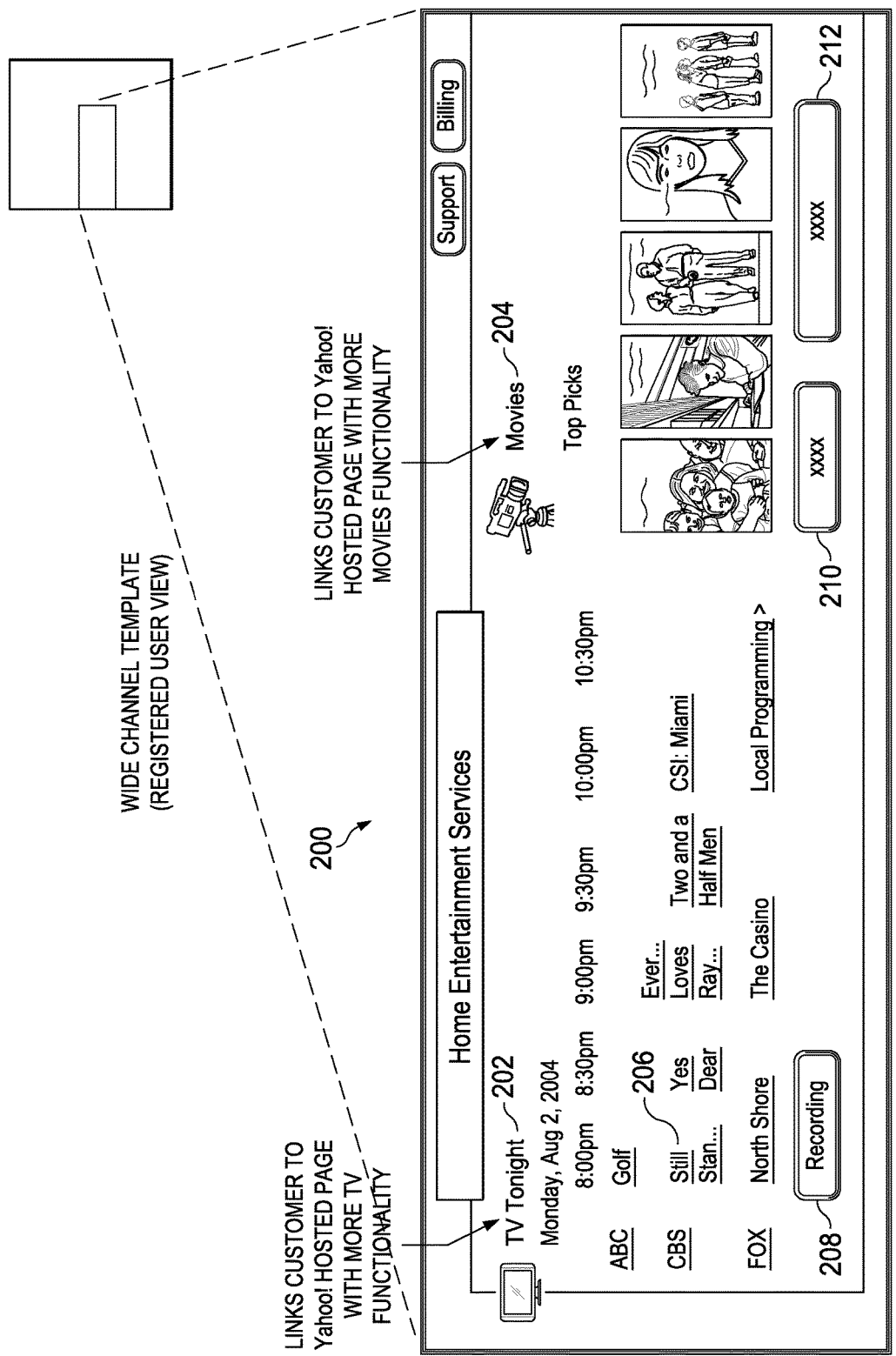
FIG. 2 shows an exemplary control panel or user interface 200 that may be provided by to an STB.

FIG. 2 shows an exemplary user interface ("Control Panel") 200 that may be provided by the Control Panel application provider to an STB. The exemplary Control Panel enables a user to select content from a listing, such as from a listing of live TV programs 202 or a listing of VoD content 204. The user selects a TV program by selecting a link 206 or may record a program by selecting a record button 208. The user may also select a Browse button 212 to navigate through a catalogue, such as movie catalogue, or select a Download button 210 to view content, such as movie from a VoD server.

Figure 3:
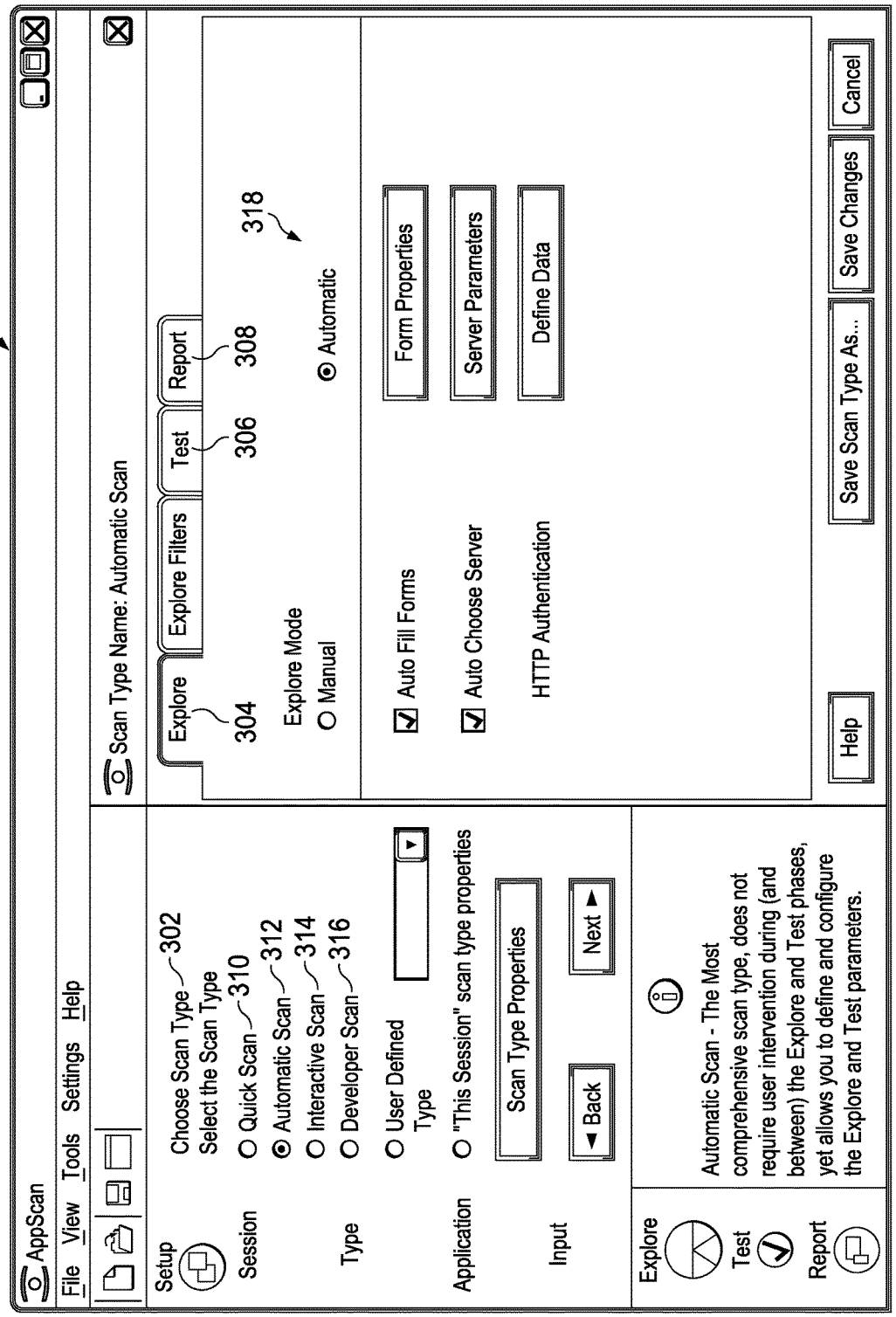
FIG. 3 shows an exemplary user interface to a program for scanning a website used according to one aspect of the present disclosure.

FIG. 3 shows an exemplary user interface 300 to a program for scanning a website used in one aspect of the disclosure. The user interface enables an operator to select a type of scan 302 such as a Quick Scan 310 to detect common vulnerabilities, an Automatic Scan 312 to scan for known vulnerabilities and poorly-configured applications, an Interactive Scan 314 that enables the user to control what portion of an application gets scanned, and a Developer Scan 316 designed for scanning application-specific code. The user interface further enables an operator to select several parameters concerning different stages of a scan, such as an Explorer stage 304 for mapping a website and discovering possible vulnerabilities, a Test stage 306 for testing the possible vulnerabilities with hack techniques, and a Report stage 308 for reporting discovered security vulnerabilities.

As shown in the exemplary illustration of FIG. 3, the Explorer stage may be performed in a manual exploration or an automatic exploration mode 318.

FIG. 4 shows an exemplary high-level report 400 in one aspect of the disclosure that summarizes the results from scans performed via the user interface of FIG. 3. The exemplary report includes information related to severity of the vulnerability 402, an industry name of the vulnerability 404, a category under which the vulnerability falls 406, a report on the potential impact of the vulnerability 408, and the number of such vulnerabilities found 410. The report lists vulnerabilities in order of severity or risk level as determined by the potential destructiveness of the vulnerability 412. An explanation may be provided of the effect of the security vulnerability 414.

Figure 5:
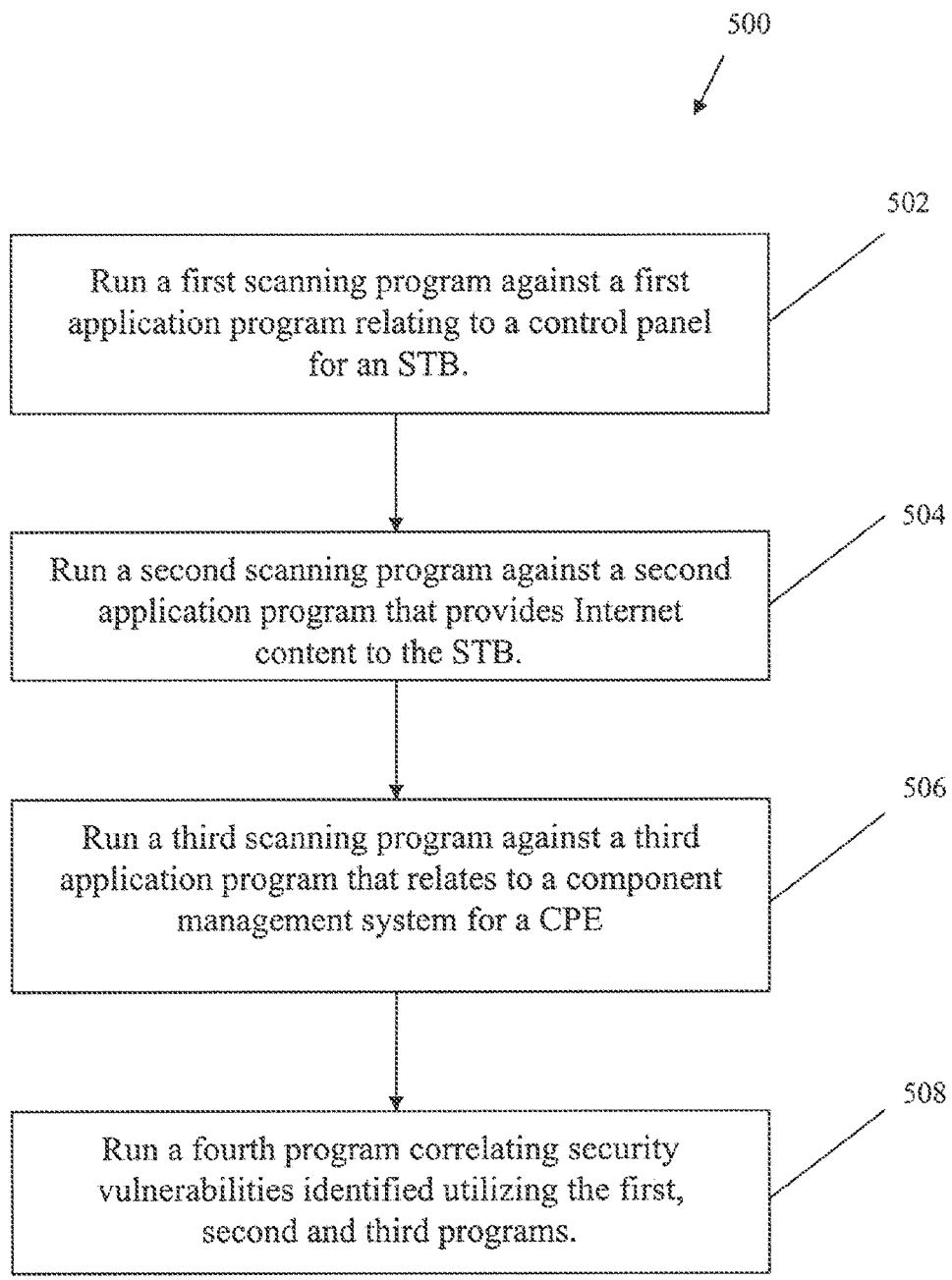
FIG. 5 shows a flowchart of a method for determining security vulnerabilities in software associated with CPE according to one embodiment of the present disclosure.

FIG. 5 shows a flowchart 500 of an aspect of the present disclosure for determining security vulnerabilities of programs relating to a CPE. In Box 502, a first scanning program is run against a first application program relating to a Control Panel for an STB. A second scanning program is run against a second application program that provides Internet content to the STB (Box 504). In Box 506, a third scanning program is run against a third application program that relates to the component management system of CPE. In Box 508, a program correlates security vulnerabilities identified utilizing the first, second and third scanning programs to determine a total vulnerability of the network. Additionally a fourth scanning program may be run against a fourth application that operates at an STB.

Figure 6:
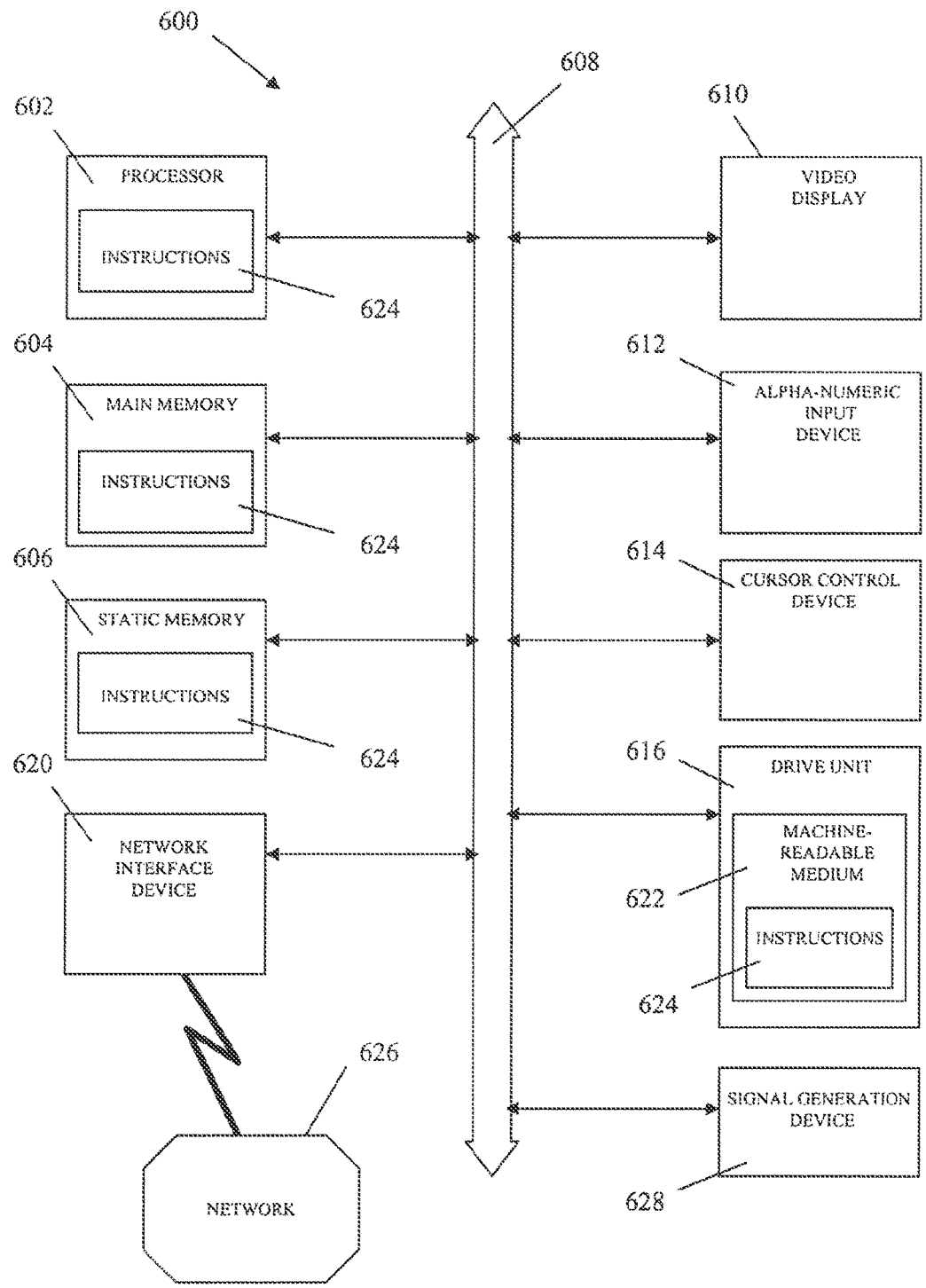
FIG. 6 is a diagrammatic representation of a machine in the form of a computer system within which a set of instructions, when executed, may cause the machine to perform any one or more of the methodologies discussed herein.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server, or a client-user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The present disclosure contemplates a machine-readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the disclosed subject matter may be referred to herein, individually and/or collectively, by the term "disclosure" merely for convenience and without intending to voluntarily limit the scope of this application to any single disclosure or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory computer-readable storage medium including processor executable instructions that, when executed by a processor, cause the processor to perform operations comprising:

scanning, with a website scanning program, a control panel application for enabling a user to access a set-top-box remotely to navigate and select content, wherein the website scanning program is configured to access the set-top-box via a broadband connection to a modem locally coupled to the set-top-box, wherein scanning the control panel application includes:
receiving a uniform resource locator (URL) associated with a web server level of the control panel application, wherein the URL is indicative of a particular website; and
automatically navigating the particular website as a simulated user to discover links and record responses;

scanning, with an operating system level scanning program, the control panel application and an operating system in which the control panel application is executing;

scanning, with the website scanning program, a second application, wherein the second application provides Internet content to the set-top-box;

scanning, by the operating system level scanning program, the second application;

scanning, with a third scanning program, a component management application for managing and auto-configuring the set-top-box with a third scanning program; and correlating security vulnerabilities identified by the website scanning program, the operating system level scanning program, and the third scanning program.

2. The computer-readable storage medium of claim 1, wherein scanning the second application with the website scanning program comprises testing a web server level of the second application.

3. The computer-readable storage medium of claim 2, wherein testing the web server level of the second application includes:
receiving a uniform resource locator (URL) associated with the web server level of the second application, wherein the URL is indicative of a particular website; and
automatically navigating the particular website as a simulated user to discover links and record responses.

4. The computer-readable storage medium of claim 1, wherein the broadband connection includes a cable connection.

5. The computer-readable storage medium of claim 1, wherein the broadband connection includes a satellite connection.

6. The computer-readable storage medium of claim 1, wherein the operations include:
assigning risk levels to security vulnerabilities identified by the website scanning program and the operating system level scanning program; and
providing a report indicative of the risk levels.

7. The computer-readable storage medium of claim 1, wherein the website scanning program accesses the set-top-box using a pass through connection to the modem.

8. A method of determining security vulnerabilities associated with providing television services to a set-top-box over a communications network, the method comprising:

scanning, with a website scanning program, a control panel application for enabling a user to access a set-top-box remotely to navigate and select content, wherein the website scanning program is configured to access the set-top-box via a broadband connection to a modem locally coupled to the set-top-box, wherein scanning the control panel application includes:

receiving a uniform resource locator (URL) associated with a web server level of the control panel application, wherein the URL is indicative of a particular website; and automatically navigating the particular website as a simulated user to discover links and record responses;

scanning, with an operating system level scanning program, the control panel application and an operating system executing associated with the control panel application;

scanning, with the website scanning program, a second application, wherein the second application provides Internet content to the set-top-box;

scanning, by the operating system level scanning program, the second application;

scanning, with a third scanning program, a component management application for managing and auto-configuring the set-top-box with a third scanning program; and correlating security vulnerabilities identified by the website scanning program, the operating system level scanning program, and the third scanning program.

9. The method of claim 8, wherein scanning the second application with the website scanning program comprises testing a web server level of the second application.

10. The method of claim 9, wherein testing the web server level of the second application includes:
receiving a uniform resource locator (URL) associated with the web server level of the second application, wherein the URL is indicative of a particular website; and automatically navigating the particular website as a simulated user to discover links and record responses.

11. The method of claim 8, wherein the broadband connection includes a cable connection.

12. The method of claim 8, wherein the broadband connection includes a satellite connection.

13. The method of claim 8, wherein the method further comprises:
assigning risk levels to security vulnerabilities identified by the website scanning program and the operating system level scanning program; and
providing a report indicative of the risk levels.

14. The method of claim 8, wherein the website scanning program accesses the set-top-box using a pass through connection to the modem.

15. A server, comprising:
a processor; and
a storage medium including a database to store information relating to security vulnerabilities for a plurality of applications associated with a customer device and processor executable program instructions that, when executed by the processor, cause the processor to perform operations comprising:
scanning, with a website scanning program, a control panel application for enabling a user to access a set-top-box remotely to navigate and select content, wherein the website scanning program is configured to access the set-top-box via a broadband connection to a modem locally coupled to the set-top-box, wherein scanning the control panel application includes:
receiving a uniform resource locator (URL) associated with a web server level of the control panel application, wherein the URL is indicative of a particular website; and automatically navigating the particular website as a simulated user to discover links and record responses;

scanning, with an operating system level scanning program, the control panel application and an operating system associated with the control panel application;

scanning, with the website scanning program, a second application, wherein the second application provides Internet content to the set-top-box;

scanning, by the operating system level scanning program, the second application;

scanning, with a third scanning program, a component management application for managing and auto-configuring the set-top-box with a third scanning program; and correlating security vulnerabilities identified by the website scanning program, the operating system level scanning program, and the third scanning program.

16. The server of claim 15, wherein:
scanning the second application with the website scanning program comprises testing a web server level of the second application.

17. The server of claim 16, wherein:
testing the web server level of the second application includes:
receiving a uniform resource locator (URL) indicative of a second particular web site; and
automatically navigating the second particular website as a simulated user to discover links and record responses.

18. The server of claim 15, wherein automatically navigating comprises invoking a web crawler configured to automatically navigate.

19. The server of claim 15, wherein the broadband connection includes at least one of: a cable connection and a satellite connection.

20. The server of claim 15, wherein the operations include:
assigning risk levels to security vulnerabilities identified by the website scanning program and the operating system level scanning program; and
providing a report indicative of the risk levels.

* * * * *